Inventors
Andrew H. Selzer
Eugene G. Berry
Ralph E. Williams by Parker & Carter
Attorneys

May 22, 1956  A. H. SELZER ET AL  2,746,865
ROASTING METHOD
Filed Oct. 25, 1951  8 Sheets-Sheet 8

Inventors
Andrew H. Selzer
Eugene G. Berry
Ralph E. Williams
by Parker & Carter
Attorneys

United States Patent Office 2,746,865
Patented May 22, 1956

2,746,865

ROASTING METHOD

Andrew H. Selzer, Evergreen Park, Eugene G. Berry, Chicago, and Ralph E. Williams, River Forest, Ill., assignors to B. F. Gump Co., Cicero, Ill., a corporation of Illinois Application October 25, 1951, Serial No. 253,094

7 Claims. (Cl. 99—68)

The invention relates to an improvement in roasting methods, and has for one purpose to provide an improved method which may be employed in roasting coffee, peanuts, cereals and other substances.

Another purpose is to provide a roasting method in which a source of radiant energy is an important factor in the roasting.

Another purpose is to provide an improved method of roasting and an improved structure for carrying out such method, in which the location of an incandescent source of radiation and of the product to be roasted are so related as to accomplish a desired absorption of the waves of radiation by the product undergoing roasting, regardless of the wave length of the radiation.

Another purpose is to provide an improved method of roasting in which a charge of the product is circulated about an open space, and is contoured in optimum relation to the radiation entering such space.

Another purpose is to provide a roasting method in which a substantially inert atmosphere is maintained in the roasting zone, whereby combustion in such zone is limited, if not completely prevented.

Another purpose is to provide a roasting method and apparatus in which an environment or atmosphere is maintained in the roasting space which does not support combustion.

Another purpose is to provide a method in which a scavenging circulation of atmospheric air passes about the exterior of the material undergoing roasting, without entering the actual roasting zone, whereby heated gases and products of combustion and fine particles are removed.

Another purpose is to provide a positive control of the stack temperature of the roaster, irrespective of the temperature of the heated atmosphere from the roasting zone, while maintaining a positive control of the heat balance throughout the machine.

Another purpose is to reduce to a minimum the amount of free oxygen in the atmosphere in the roasting zone.

Another purpose is to roast without the presence of an open flame in or near the roasting zone.

Another purpose is to eliminate any substantial possibility of product contamination.

Other purposes will appear from time to time in the course of the specification and claims.

We illustrate the invention more or less diagrammatically in the accompanying drawings wherein.

Like parts are indicated by like symbols throughout the specification and drawings.

Our structure for the carrying out of our method broadly includes an outer, normally fixed housing, a pervious-walled cylinder rotating in such housing, flights within the cylinder surrounding an open space in the cylinder, and an incandescent heating element located outside of the cylinder but in communication with the open space within the flights.

Figure 1:
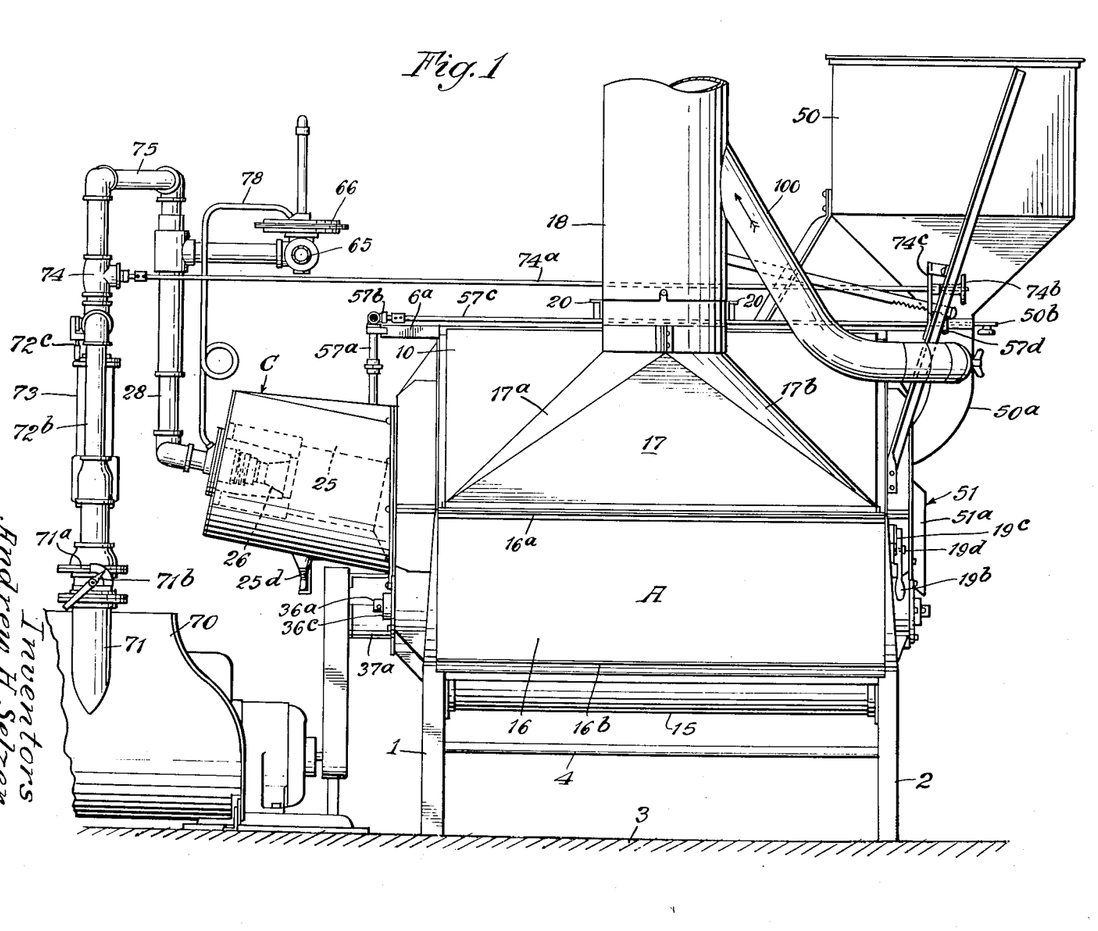
Figure 1 is a side elevation.
Figure 2:
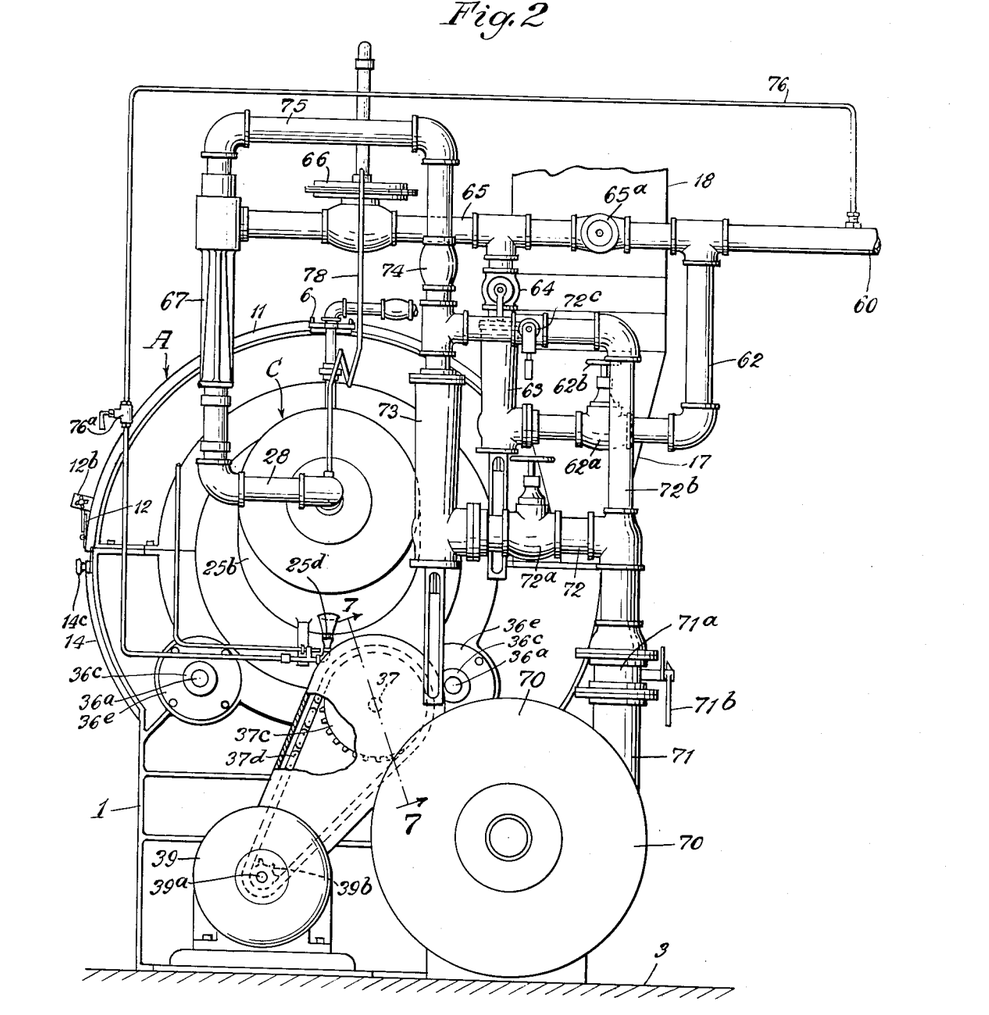
Figure 2 is a rear elevation.
Figure 3:
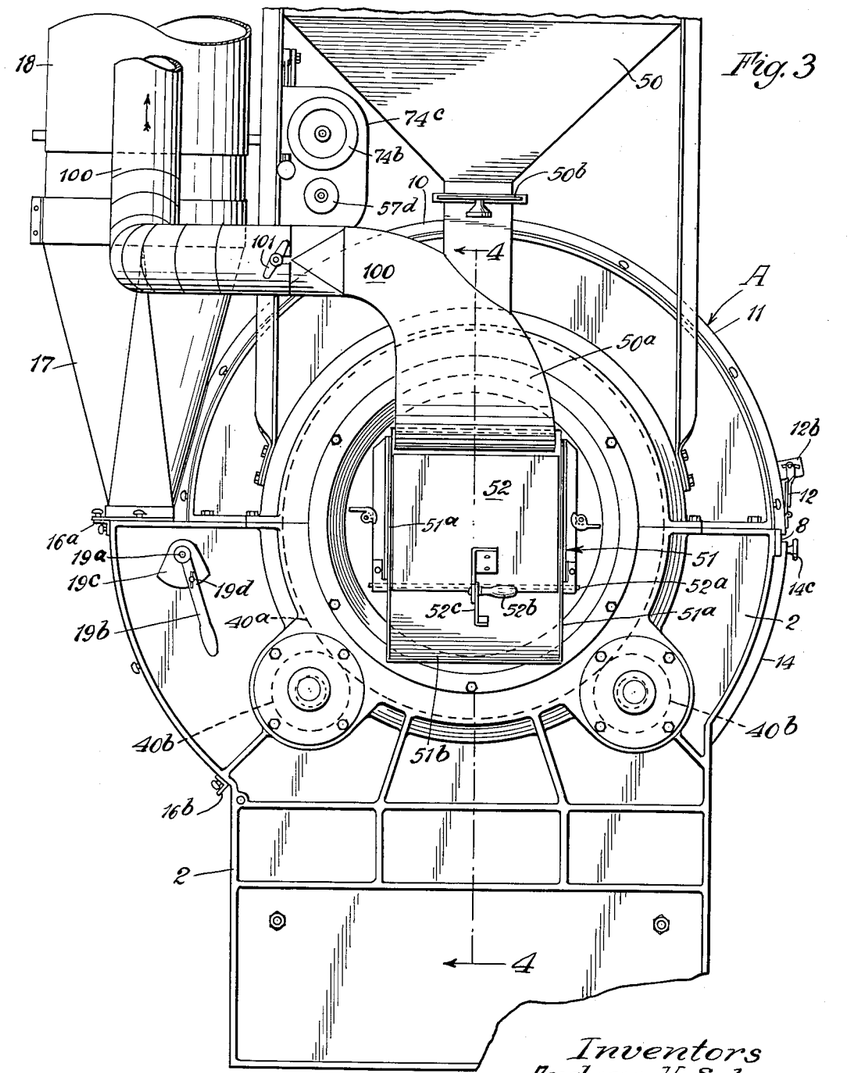
Figure 3 is a front elevation.
Figure 5:
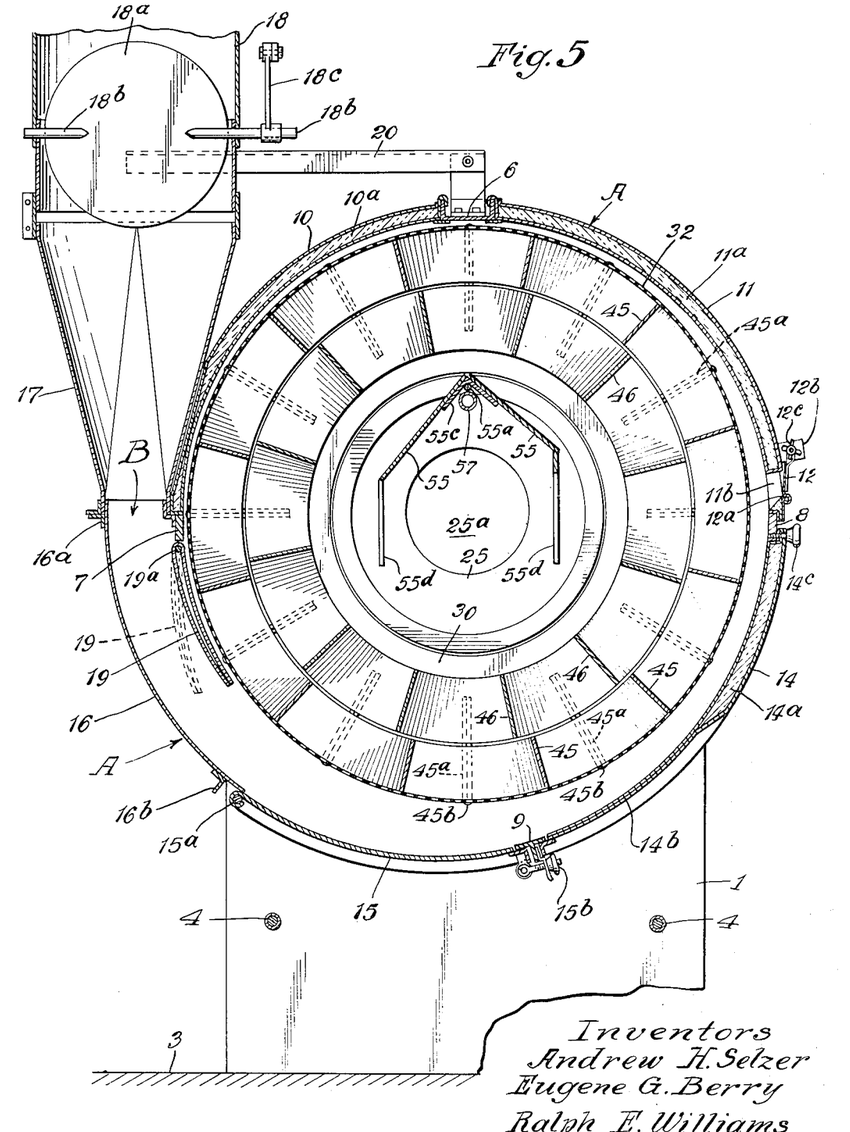
Figure 5 is a section on the line 5—5 of Figure 4.

Referring to the drawings, and considering, for example, Figures 1, 2 and 3, numerals 1 and 2 are any suitable end castings or plates or supports resting on any suitable base or foundation 3. They may, for example, be connected with tie rods or other holding elements, 4. An outer shell structure, generally indicated as A, extends between the end members 1 and 2. It is shown in section in Figure 5. The shell is shown, for example, as formed of a plurality of separate or separable parts, as shown in Figure 5. 6 is a top supporting connection extending between and connected to the end plates or members 1 and 2. It also has a rear end extension 6a, as shown in Figure 1. 7, 8, shown in Figure 5, are side connectors or supports which extend between the main members 1 and 2. 9 indicates a lower support, shown as a T-shaped member, which extends between the end plate members 1 and 2. Thus, the end plates or members 1 and 2 are connected by a series of supports, and, as will below appear, they form the end closures of the space surrounded by the shell proper.

10 is a shell segment or section, shown as extending between and supported on the members 6 and 7. It is shown, in Figures 5 and 6, as a double-walled element, having interior insulation 10a. 11 is another double-walled shell segment extending between the supports 6 and 8. It also is shown with an insulating inferior member 11a. It is shown as having an air inlet gap or slot 11b along or adjacent its lower edge, as shown in Figure 5. The slot may be controllably closed by a shutter 12 hinged, as at 12a, and controlled by brackets 12b which carry thumb screws 12c. It will be understood that an inflow of air through the gap 11b may be prevented or adjustably controlled. As will later appear, the slot or gap 11b permits an inflow of atmospheric scavenging air which passes clockwise about the cylinder, referring to the position of the parts as shown in Figure 5. As will later appear, this scavenging air does not enter the roasting zone within the cylinder but is drawn off through the gap B.

14 is a third shell segment extending between the supported upon the supports 8 and 9. It is, in part, double-walled and insulated, as at 14a. It includes a lower portion 14b in which the two walls are shown as abutting. The shell element or segment 14 is shown as removably held in position by any suitable securing knob 14c on the side member 8. 15 is a shell segment or portion hinged, as at 15a, to the end members 1 and 2. It is removably held in the position in which it is shown in Figure 5, by any suitable knob or knobs or locking elements 15b. 16 is the final shell element or segment extending between and secured to the end members or plates 1 and 2, and provided with any suitable top and bottom reinforcement 16a and 16b.

As will be clear from Figure 5, the shell segments, taken as a whole, define a spiral with a gap B between the upper edge of the section 16 and the opposed lower edge of the section or panel 10. This gap B forms an outlet to a duct 17, the side walls of which, at 17a and 17b, as shown in Figure 1, converge to the cylindrical pipe 18, through which the scavenging air and also the products of combustion, as well as the by-products of roasting, which escape from the interior of the roaster, may upwardly pass. Any suitable butterfly valve or damper 18a may be pivoted within the duct or pipe 18, as upon pins 18b. Its position may be controlled by the exterior radius arm 18c, the control connections being later described herein. In addition to the valve or shutter 18a, a lower shutter or gate 19 is provided, hinged as at 19a and extending from end to end of the shell. As will be clear from Figure 5, it may be moved about its pivot 19a variably to control the cross-section of the outlet from the interior of the roaster to the gap B. An outside control handle 19b is illustrated in Figure 3, the handle being located in any suitable position on the quadrant 19c by any suitable locking means 19d. As shown in Figures 1 and 5, the numerals 20, 20 indicate any suitable supports or braces extending between the longitudinal top support 6 and the pipe 18. It will be understood that the inflow of scavenging air, and also the subsequent flow of the scavenging air, the products of combustion, and the by-products of roasting, can be positively controlled, while maintaining a positive control of the stack temperature, by means of the suitable controls elsewhere herein described. These controls include the control 12 for the inflow of air to the interior of the scroll or shell segment 14, the control 18a in the duct 18, and the control 19 within the enlarged part of the scroll, all being shown, for example, in Figure 5. The relationship between the passage 50a of Figure 4 and the movable closure 52 will be described later, and also the operation of the control 101 shown in Figure 3. In connection with these controls and their operation, suitable external suction means, not herein shown, may be connected to the duct 18 to maintain a desired and controllable movement of gases away from the roasting zone and through said duct 18.

Figure 4:
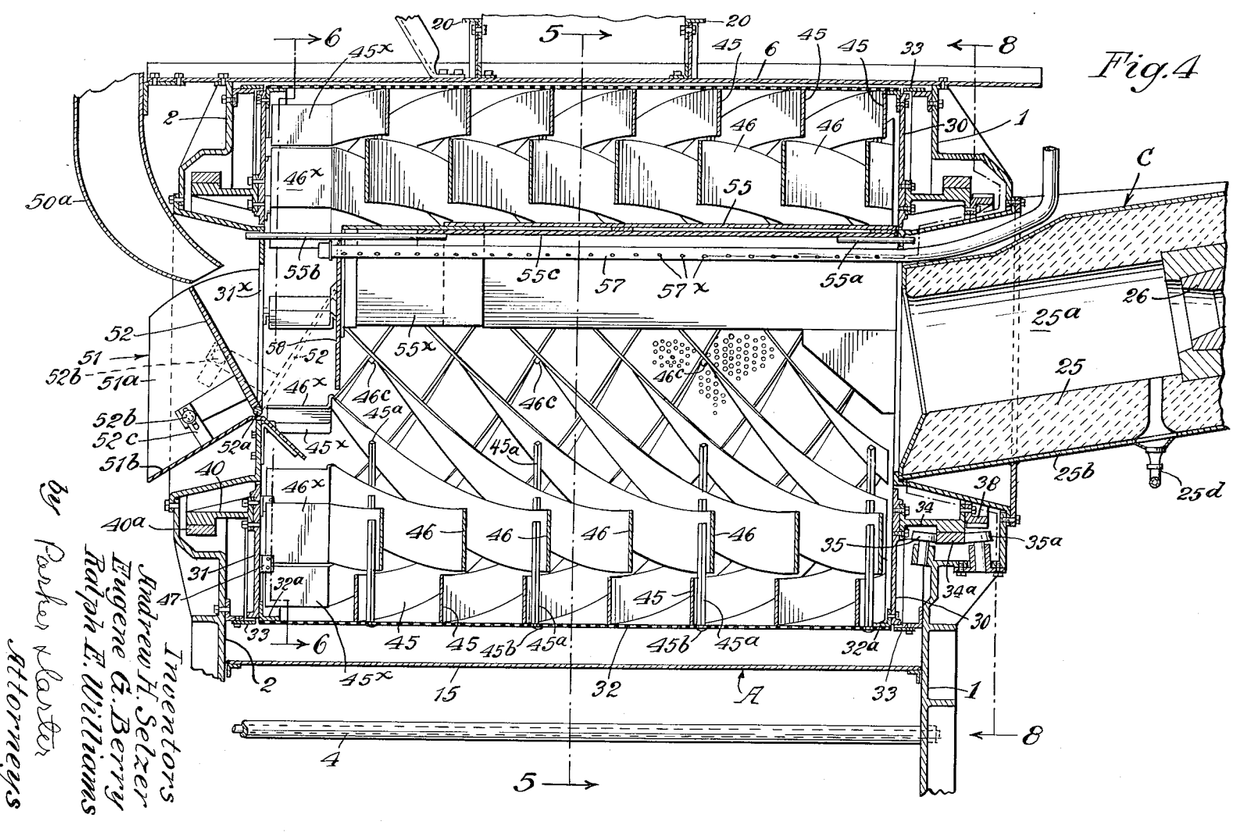
Figure 4 is a section on the line 4—4 of Figure 3.

It will be understood that, by means below described, a charge of material to be roasted, such as coffee beans, may be rotated within the shell. In order to roast the contents of the shell a heating assembly, generally indicated as C in Figure 1, is positioned at one end of the roaster shell. It is shown as including a generally cylindrical body 25 of suitable refractory material, which defines a central, generally cylindrical passage or opening 25a. Any suitable outer housing or heater shell 25b, as shown in Figure 4, may be employed with any suitable pilot burner 25d. It will be understood that the burner assembly may be suitably supported on the adjacent end member or plate 1, the details of the supporting connections being not of themselves important, and not forming, per se, part of the present invention. A gas-introducing member or assembly, generally indicated as 26, is shown as in communication with the outer end of the bore 25a of the refractory cylinder 25. The details of the burner element 26 do not of themselves form part of the present invention, but it will be understood that a suitable fuel, such as a gas, may be admitted through the fuel pipe, generally indicated as 28, in Figures 1 and 2. The details of the fuel control system will later be described. It should be kept in mind that the cylindrical refractory body 25, in use, constitutes an incandescent heating element to which an adequate mixture of fuel and oxygen is supplied. There is no flow of atmospheric air through or beyond the interior of the incandescent body or sleeve 25. Adequate air or oxygen to support combustion is substantially, if not completely, used up in the course of combustion.

Rotatably positioned within the above-described shell is a drum structure, shown in Figure 4, which includes annular end plates 30, 31. The two end rings support and are connected by a foraminous screen cylinder 32 having end reinforcing angles 32a secured to the end plates or rings 30 and 31, respectively. At each end there are provided sealing rings 33, the edges of which overlap the edges of the end rings 30 or 31. Mounted on the end plate or ring 30 is the annular driving and guiding member 34. It is shown as having a guiding ring component 34a which rotates between guiding rollers 35, 35a, as shown at the lower right-hand part of Figure 4.

Figures 8, 9:
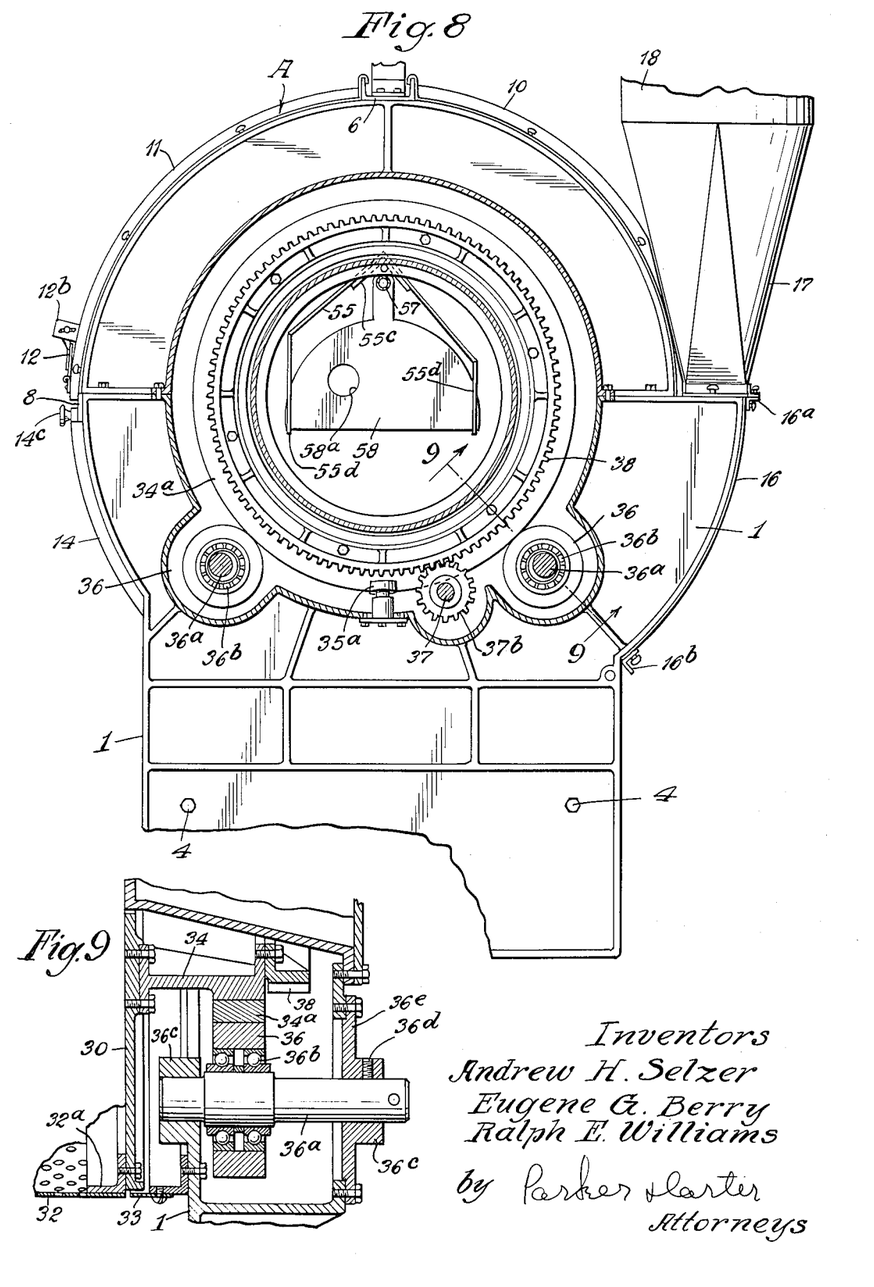
Figure 8 is a section on the line 8—8 of Figure 4.
Figure 9 is a section, on an enlarged scale, on the line 9—9 of Figure 8.

The guiding ring portion 34a is also supported on supporting rollers 36, as shown in Figure 8. These rollers are mounted on any suitable stub shafts 36a and are provided with anti-frictional bearing assemblies 36b. The shafts 36a are mounted at their ends in suitable bushings 36c. It will be understood that the shafts 36a are normally held in fixed position, for example, by the locking screws 36d, but that they may be removed. As shown in Figure 9, it will be seen that one of the members 36c forms part of a removable plate 36e secured to the end member 1.

Figure 7:
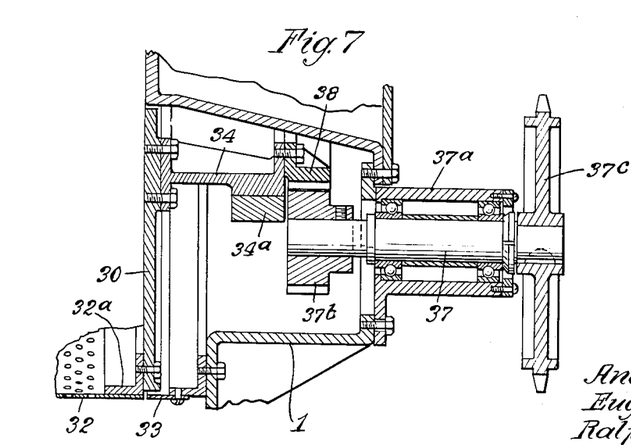
Figure 7 is a section, on an enlarged scale, on the line 7—7 of Figure 2.

In order to drive or rotate the drum there is provided a drive shaft 37 mounted in any suitable bearing assembly 37a. The shaft is shown, as in Figure 7, as carrying a pinion 37b in mesh with a ring gear 38 which is secured to or forms part of the annular structure 34. The shaft 37 may be rotated by any suitable driving connection, for example, by the sprocket 37c about which passes any suitable chain or driving element 37d, shown in Figure 2. 39 indicates, for example, an electric motor with its drive shaft 39a and pinion 39b about which the chain 37d passes. It will be understood, of course, that any other suitable means may be employed. With the structure as shown, when the motor 39 is being driven, it drives the shaft 37 and, through it and the ring gear 38, shown in Figures 7 and 8, rotates the drum structure. The guiding and driving structure just described is located at the rear end of the roaster, the right-hand end, referring to the position of the parts as shown in Figure 4. The opposite or front end of the drum is similarly supported. With reference, for example, to Figures 3 and 4, an annular guide 40 is employed with its terminal ring 40a. This ring is supported by a pair of rollers 40b which are mounted similarly to the rollers 36 of Figure 9. It will be understood that the rollers 40b, and also the rollers 36, are eccentrically mounted to provide for adjustment.

Figure 6:
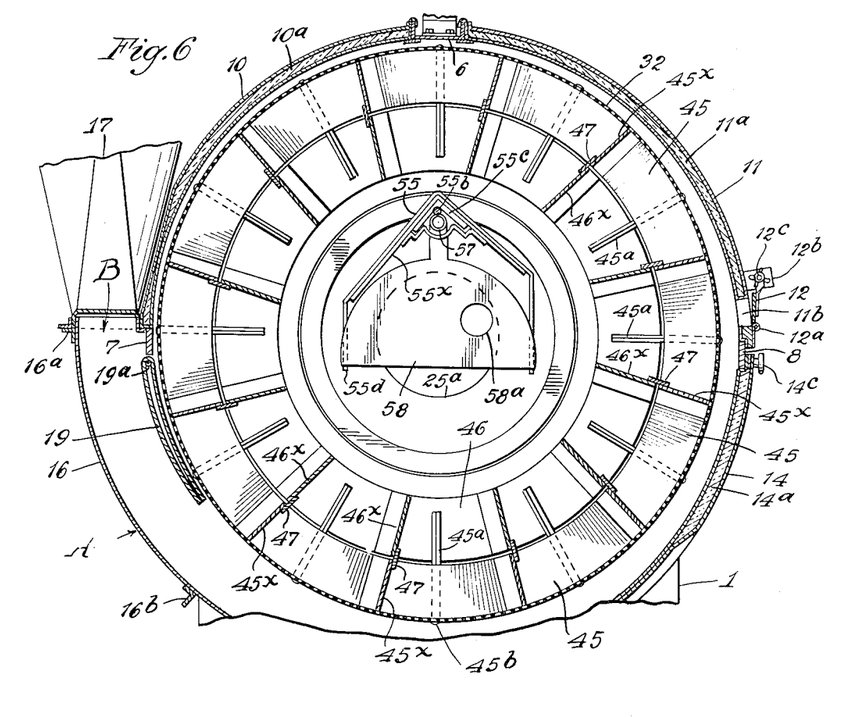
Figure 6 is a section on the line 6—6 of Figure 4.

Within the drums are employed two sets of spiral vanes or flights, the inner set being of greater radial width than the outer, in order to equalize the thrust load, as will later appear. The outer set, including the various vanes or flights 45, shown in Figures 5 and 6, may advantageously engage the interior of the foraminous wall 32 of the drum itself. The inner set 46 is reversely spiraled, in relation to the vanes or flights 45, and may be supported, for example, by the generally radially, inwardly extending supporting rods 45a which are riveted, welded or otherwise secured to the drum, as at 45b. As will be clear from Figure 4, the rods 45a terminate adjacent or within the inner edges of the innner vanes 46, and the vanes or flights may be spot-welded or otherwise secured to the rods. An advantageous arrangement, as shown in Figure 4, is to arrange the rods 45a in positions where they may engage and be secured to vanes or flights of both series. This situation is indicated, for example, at 46c in Figure 4. Whereas welding the vanes or flights to these radial rods is a convenient method of securing the two sets of vanes or flights, it will be understood that we do not wish to be limited to this particular securing means. At the front or feeding receiving end of the drum the ends of the vanes or flights are bent or offset to form what are, in effect, elevating and discharging buckets. At the left-hand end of Figure 4, for example, the vanes or flights 46 are shown as having radial bucket portions 46x. The vanes or flights 45 have similar radial bucket portions 45x. The result is to provide a series of generally radial conveying elements, as shown in Figure 6. The adjacent or abutting portions 45x and 46x may be connected as by connector plates or brackets 47, which are shown as attached to the end plate or ring 31. Thus we provide what is, in effect, an end tier of buckets at the feeding and discharging end of the roaster.

50 indicates any suitable feed receiving hopper which, through the chute or spout 50a, delivers the material to be roasted, for example, coffee beans, when the gate 50b of Figure 3 is open. The chute or spout 50a has a downwardly and inwardly curved or inclined end portion which delivers the material somewhat endwise of the drum. The adjacent end plate 31, shown in Figure 4, has an axial aperture 31x. A frame member, generally indicated as 51, and including side frame members 51a and a discharge spout 51b, surrounds or is aligned with the aperture. Mounted in the frame member for rotation about the axis 52a is the deflecting baffle 52. When the baffle 52 is in the full-line position in which it is shown in Figure 4 it serves to direct material to be roasted inwardly from the chute 50a to the bucket line or conveyor formed by the members 45x and 46x. Thus, in response to rotation of the drum, the material to be roasted is elevated, at least in part, to be received by the vanes or flights 45 and 46. It will be understood, of course, that there may be a sufficient lateral component of movement on the part of the material discharged down through the chute 50a to project particles all the way through the bucket ring or bucket chain into the inter-vane spaces or against the spiral vanes proper. 52b is a handle for the baffle 52, and 52c is an adjustable stop which may be adjusted, for example, by the manual control member 52b. It will be understood that the parts are so set that the operator, by merely pulling downwardly and outwardly on the handle 52b, withdraws the baffle 52 to the desired relationship with the lower end of the chute 50a. After a full charge has been admitted to the interior of the drum the operator could move the baffle 52 to an intermediate position within the frame 51. However, under normal circumstances, it may be advantageous to leave it in the full-line position of Figure 4, which leaves a gap through which the operator can observe conditions within the drum.

It will be understood that when a roasted charge is being removed from the interior of the drum the baffle 52 may be moved manually to the dotted-line position of Figure 4, in which position it receives the discharge from the bucket portions 45x and 46x and discharges it downwardly by the chute 51b. It will be understood that the chute 51b may extend to any suitable receiving or conveying mechanism to receive the roasted or completed charge.

Figure 10:
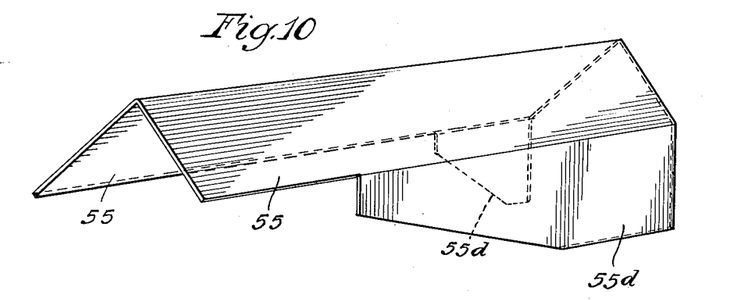
Figure 10 is a perspective view of a deflector plate.

In order to maintain the charge or the product in a proper location to receive radiation from the burner we provide a top deflector or canopy or contouring member, generally indicated as 55. This canopy keeps the coffee out of the danger zone of excess temperatures, and prevents its exposure to excessive radiation from the burner. The effect of the canopy is to maintain the product in movement at opposite sides of an open and properly contoured space in direct communication with the burner. To support the canopy 55, we may employ, for example, end supporting rods 55a and 55b, suitably supported on the end members 1 and 2, respectively. They may carry a suitable angle 55c upon which the canopy 55 is supported. As shown, for example, in Figure 5, the roof 55 is shown as having two inclined top portions, and as including, adjacent the burner end, downward vertical walls or extensions 55d. As shown in Figure 10, one of the walls 55d is shorter than the other. If desired, as shown in Figure 4, we may employ an adjustable end member or extension 55x in telescopic relationship with the main canopy member 55. It is shown in Figure 4 substantially fully extended, but in its free extended position it still terminates within the ends of the spiral vane elements 45 and 46.

Figure 11:
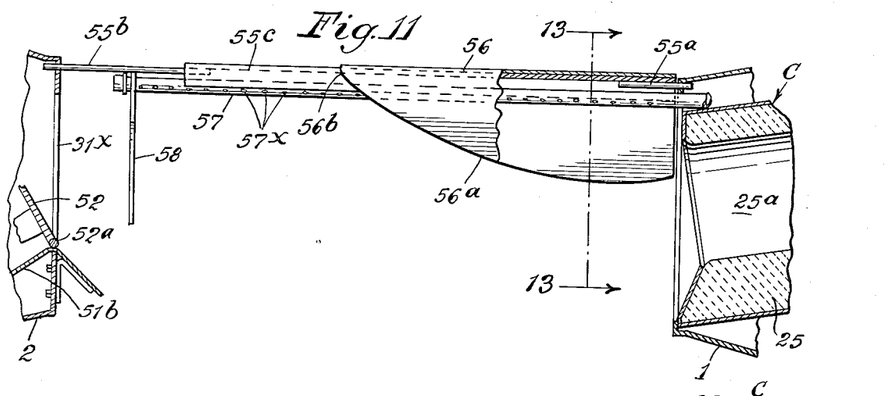
Figure 11 is a side elevation, with parts in section, of a variant form of deflector.
Figures 12, 13:
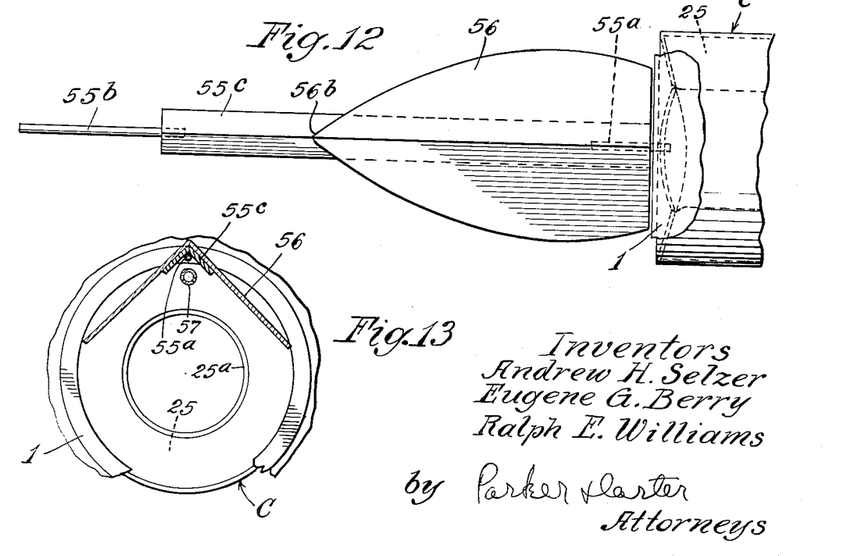
Figure 12 is a partial plan view of the structure of Figure 11.
Figure 13 is a section on the line 13—13 of Figure 11.

It will be understood that the shape and arrangement of the roof, canopy or top deflector may be widely varied. In Figures 11, 12 and 13 we illustrate a somewhat simpler form in which an angular canopy or deflector 56 is provided, having curved lower edges 56a which converge upwardly and outwardly to a point or reduced portion, as at 56b. It will be observed that in the form of Figures 11 and following the canopy deflector is substantially shorter than the deflector shown in Figure 10. Thus the contouring of the material surrounding the inner space is controlled.

In all the forms of the canopy we provide a quenching pipe 57 which extends to any suitable source of water. It extends from any suitable water connection or pipe 57a, the flow of water being controlled by any suitable valve 57b. The valve may be controlled by a rod 57c having a forwardly accessible handle 57d. It will be understood that after the roasting period is concluded, the operator may quench the roasting by permitting water to flow through the pipe 57 and its spray apertures 57x. The forward end of the pipe 57 may be supported by the shield or protector 58, shown, for example, in Figure 6. The shield may be apertured, as at 58a, to permit inspection of the interior of the drum during roasting.

An adequate system of manual controls is illustrated, for example, in Figure 2. 60 indicates a gas inlet or connection to a source of gaseous fuel. Gas normally flows through the pipe 62 past any suitable valve 62a, with its manual control handle 62b. The gas which passes the valve 62a flows to a gas flow-scope 63 and thence past a valve 64 to an upper gas pipe 65. The gas pipe 65 may receive gas directly from the gas inlet 60, but this cut-off is normally prevented by the bypass control valve 65a.

The left end of the pipe 65, referring to the position of the parts as shown in Figure 2, delivers gas past the zero governor 66, whence it flows to the inspirator 67 and, by the pipe 23, to the earlier described burner assembly. Combustion air is supplied by the following circuit. 70 is any suitable air compressor or pump driven by any suitable motor. Air passes thence by the passage 71 past any control valve 71a with its control handle and indicator 71b. Air normally flows through the pipe 72 past the manually controllable valve 72a to the air flow-scope 73. 72b is any suitable bypass controlled by the valve 72c. Air from the flow-scope or from the bypass passage 72b flows past the main burner valve 74 and along the pipe 75 to the inspirator 67. The valve 74 may be controlled, for example, by the rod 74a, with its wheel or handle 74b mounted on any suitable panel 74c at the front of the roaster. It will be understood that air is thus controlled for delivery in volume adequate to support combustion, while preventing the flow of free or unused air to the roasting zone, since we desire to maintain an environment which does not support combustion in the roasting zone.

Gas may be supplied to the pilot 25d as follows: A pilot supply pipe 76 extends from the main gas pipe 60 to the pilot burner 25d, 76a being a manual control valve therefor.

In connection with the main gas supply we illustrate a connection 78 between the burner and the diaphragm of the zero governor 66.

We find it important, in operation, to be able to control the pressure condition within the roasting zone, and, specifically, to withdraw gases and by-products of roasting from the roasting zone. We illustrate, for example, a suction outlet member 100, shown in Figure 3, which branches from the delivery spout 50a. It extends to the main suction outlet duct 18 and may be controlled, for example, by any suitable shutter handle 101, shown in Figure 3, the shutter attached to the handle being within the duct or pipe 100, and being not indicated in detail. It will be understood, of course, that the duct or passage 100 extends to the outlet or suction passage 18, shown in Figure 5, at a point above the control valve or shutter 18a.

It will be realized that whereas we have described and shown a practical and operative device, nevertheless, many changes may be made in size, shape, number and disposition of parts without departing from the spirit of our invention. We wish it to be understood that wide changes may be made in controls within the frame of our invention.

The use and operation of the invention are as follows:

We provide a method, and a practical machine designed to employ that method, for the commercial roasting of coffee beans, peanuts, cereals, and analogous products. For the purpose of simplification we refer to the material to be treated as the product.

In our method and machine we provide a source of radiation as a medium for roasting. This source of radiation we locate in what we consider an advantageous position in relation to the product, to obtain an optimum or desired absorption of radiation by the product to be roasted, regardless of wave length. The product is located and contoured in relation to the source of radiation by the above-described canopy 55. The vanes or flights 46 drop the product on the canopy 55, and the canopy contours or guides or delivers the product in the desired relationship to the source of radiation. The product is so located and contoured in relation to the source of radiation as to provide a satisfactory absorption of the available waves, including the conversion of radiant energy to convected heat, and the economical use of the convected heat. We provide means for positively controlling the temperature of the radiant or radiating surface. We also maintain a positive control of stack temperature. We avoid any recirculation of air or of the products of combustion through the roasting zone. On the contrary, we maintain a flow of scavenging atmospheric air about at least a part of the exterior of the roasting zone, but withdraw the scavenging air, after it has performed its desired function, without permitting it to enter the roasting zone. We maintain in the roasting zone an atmosphere or an environment which will not support combustion. The roasting zone receives from the burner a minimum flow of heated gases, which are carried away by the scavenging air. The scavenging air also removes any particles of waste material and the like.

In the method and in the use of our machine we find that the radiant energy passes through the protective film of gases surrounding each bean, when coffee is being roasted, and the condition of the beans suggests that the radiant energy is transmitted or conducted, and penetrates into the fibres and cells of the bean itself. Inspection of the bean suggests that the chemical change wrought by the conversion of radiant energy takes place from inside to outside, since the outer surface of the bean remains soft longer, as the moisture is gently expelled.

When the product reaches the critical stage in its development, and is most likely to absorb the products of combustion, this being in the last sixty to ninety seconds of the roasting, the gas is shut off and air is permitted through the burner tube and over the radiant refractory surface. This combination of convected heat, diminishing radiation from the refractory or other radiant source, combined with the radiant exchange of the now "dark body" beans themselves, brings the roast to a rapid completion in an atmosphere free from any combustion.

In considering the details of operation of the structure as earlier described, a charge of the green product is admitted to the cylinder or drum through the hopper 50a and over the baffle 52. As the drum or cylinder is already rotating at the desired speed, the result of the entry of the product and the conveying action of the vanes or flights 45 and 46 is to form the product into what is substantially a hollow cylinder or more or less hemispheric moving mass. This results from the combined action of the revolving vanes or flights 45, 46, and of the stationary top deflector or spreader 55.

In the use of the device, most of the load in the upper half of the cylinder or drum is "in flight." The lower half is a relatively solid mass, undergoing forceful movement by contact with the spiral vanes or flights. Both the inner and outer diameters of the outer flights or vanes 45 are larger than the corresponding dimensions of the inner flights or vanes 46. In order to equalize the surface area or thrust load we employ inner vanes or flights 46 which are substantially wider than the outer vanes or flights 45. This difference in width clearly appears in the lower portion of Figure 4.

At the inner end of this revolving mass of material, and in line with the hollow of the material, is the source of radiation, namely, the refractory sleeve 25 with its cylindrical interior or bore 25a. It will be understood, of course, that the above described gas connections are so adjusted and employed as to maintain an adequate supply of gas and air to the burner, while preventing the admission of free or excess air to the roasting zone. When the roasting has progressed to the final point at which the beans are crepitating, and the white lines of silver skin or chaff of the beans are exposed, the gas valve 64 is closed. At this moment all actual combustion stops. The roasting process is completed by convection heat, the diminishing radiation from the radiant source, and the radiant exchange among the now "dark body" beans themselves.

When the desired degree of roast has been attained, the further development or roasting of the coffee may be checked by the introduction of a suitable amount of water, for the quench, through the spray apertures 57x of the pipe 57. It is during this quench period that the shutter attached to handle 101 in duct 100 is opened, subjecting the feed chute 50a to the suction of the external suction means. This removes particles of chaff and steam which are expelled by the rapid expansion which takes place when the quench water strikes the hot coffee in the roasting area. When the quench water has been delivered, the shutter handle is again returned to the full-line normal position, as shown in Figure 3. This normal setting permits the suction of a small volume of air. This suction, directly adjacent the opening above baffle 52, counteracts any tendency for atmospheric air to be drawn into the roasting area through the space above baffle 52 during the actual roasting process. This condition further assures an even distribution of heat over the full length of the roasting cylinder.

The finished product may then be rapidly removed from the roasting cylinder to any suitable cooling means, by merely moving the baffle 52 to the dotted-line position of Figure 4.

It will be understood that during the roasting process scavenging air is drawn through the suction or withdrawal duct 18. Accompanying the scavenging air are the heated gases, fine particles and chaff which pass through or away from the rotating cylinder. Air flows through the air inlet 11b and clockwise around the lower or scroll-shaped half of the drum, referring to the position of parts as shown in Figure 5. Therefore, no insulation is necessary for the lower part of the segment 14b, for the segment 15, or for the segment 16. What we may call secondary air is drawn through the air inlet 11b and scours about the exterior of the lower half of the drum through the scroll. This circulation is controlled by the shutter elements 18a and 19 of Figure 5.

An interesting phase of our invention is the contouring of the material or charge of product during roasting. Referring, for example, to the position of parts as shown in Figure 5, when the product enters the cylinder it is carried upwardly clockwise by the flights 45 and 46. Somewhere before reaching top center it begins to fall, its momentum carrying it in a downward arc. It strikes the spreader or canopy and is divided as it falls on both sides of the canopy. In effect, this forms two substantially parallel curtains of coffee in flight, several inches in thickness, with the beans generally uniformly spaced. The flights fill up on the bottom of the cylinder, and as the cylinder turns each flight spills its surplus into the next following flight or into the inter-flight spaces. Thus the heaviest concentration of material, referring to the position shown in Figure 5, is at the bottom left side of the cylinders. At the top of the cylinder the flights may be virtually empty, the empty condition continuing over an area of approximately 120 degrees, with its center inclined approximately 15 degrees from the perpendicular toward the right side. Another area of about 30 degrees adjacent each end of the empty section is occupied by the loosely spaced material in flight. Thus the solidly filled area occupies almost half of the circumference of the cylinder. It is at the point where the solid area begins that outside atmospheric air is admitted, through the slot 11b, to sweep the lower part of what we may call the "scroll section," formed by the members 14, 15 and 16 of the outer housing. The atmospheric or scavenging air passing through the scroll section constitutes an "air wall" of insulation, and also furnishes the necessary volume and velocity of air to carry chaff and fine particles out of the roaster. At the upper part of the cylinder a maximum fanning action takes place. Loosened chaff, dust, and products of combustion are carried through the material, through the perforated wall of the cylinder, into the cylinder housing, and close to the point where the material within the cylinder becomes solid, and where the air stream becomes strongest, due to the entry of scavenging atmospheric air through the gap or slot 11b. It will be understood, of course, that since an environment or atmosphere which does not support combustion is maintained, the likelihood of burning the chaff, dust and small particles is prevented. Whereas we have, for convenience, described coffee roasting in greater detail, it will be understood that our method may be used to roast or treat other products.

Where in the specifications or claims we employ such terms as "roaster" or "roasting," it will be understood that we wish these terms to be interpreted with sufficient breadth to cover the employment or the results of any changes, chemical or otherwise, which take place in materials treated in the structures described and shown in the present disclosure. It is further understood that whereas "roasting" of coffee may be the most usual use to which our method may be put, it may also be used for "roating" of peanuts, cereals or other materials.

We claim:

1. The method of roasting products, which includes circulating a body of the products to be roasted about an open space, subjecting the inner surface of the body, through said open space, as it circulates about said open space, to controlled radiation from an incandescent source of radiation exterior to the open space but in direct and open communication therewith, supplying a mixture of air and fuel to said incandescent source sufficient to maintain a predetermined degree of incandescence and radiation, and maintaining a flow of scavenging air directly about the exterior of said body, while preventing entry of said scavenging air into or through said body, and maintaining an environment which does not support combustion within said body of products, while it is undergoing roasting.

2. The method of roasting products, which includes circulating about a space a body of products to be roasted, subjecting the inner surface of the body, through said space, as it circulates about said space, to controlled radiation from an incandescent source of radiation exterior to the space but in direct and open communication therewith, supplying a mixture of air and fuel to said incandescent source of radiation sufficient to maintain the desired degree of incandescence and radiation while preventing the admission to the body of air sufficient to support combustion at normal roasting temperatures, maintaining a flow of scavenging atmospheric air about the exterior of the body and withdrawing said scavenging air from said body with chaff and particles from said body, while preventing entry or recirculation of said scavenging atmospheric air into or through said body.

3. The method of roasting products, which includes circulating a body of the product to be roasted about a space defined by the interior of the body being circulated, maintaining a combustion zone away from said space, burning a fuel in said combustion zone, while supplying to said fuel sufficient air to support combustion, directing the products of combustion from said combustion zone to and through said space and through the body of the product being roasted, while maintaining an environment which does not support combustion in and about the body of the product undergoing roasting, and maintaining a scavenging flow of air about the exterior of said body, while preventing entry of such scavenging air into the body of the product undergoing roasting.

4. The method of roasting coffee which includes the steps of circulating said coffee in a generally cylindrical path extending about a space defined by the inner surface of said coffee as it is circulated through said path, subjecting the inner surface of said coffee as it circulates in said path to controlled radiation from an incandescent source of radiation exterior to the space and to the generally cylindrical path, substantially preventing the admission of atmospheric air to the coffee undergoing roasting, while supplying a mixture of air and fuel to said incandescent source sufficient to maintain a predetermined degree of incandescence and radiation, and maintaining a flow of scavenging external air about the exterior of said coffee in said path.

5. The method of roasting coffee which includes the steps of circulating said coffee in a generally cylindrical path extending about a space defined by the inner surface of said coffee as it is circulated through said path, subjecting the inner surface of said coffee as it circulates in said path to controlled radiation from an incandescent source of radiation exterior to the space and to the generally cylindrical path, contouring the coffee as it circulates about said space through said path to maintain a substantially uniform absorption of the radiant heat waves by the various parts of the inner surface area of the coffee in circulation about said space and through said path, and maintaining a flow of scavenging air about the exterior of the body during the subjection of the coffee to such radiation.

6. The method of operating a product roasting and circulating drum including the step of maintaining a flow of scavenging air about the periphery of the drum at a pressure lower than the pressure within said drum to thereby continuously discharge by-products of roasting and products of combustion from the interior of the drum.

7. The method of operating a product roasting and circulating drum including the steps of maintaining a flow of scavenging atmospheric air about the periphery of the drum at a pressure lower than the pressure within said drum to thereby continuously discharge by-products of roasting and products of combustion from the interior of the drum, and subjecting the product within the drum to a source of radiant heat.

References Cited in the file of this patent
UNITED STATES PATENTS

| Re. 19,390 | Maede | Dec. 4, 1934 |
|---|---|---|
| 1,532,574 | Burns et al. | Apr. 7, 1925 |
| 1,782,946 | Talbutt et al. | Nov. 25, 1930 |
| 1,991,190 | Backer et al. | Feb. 12, 1935 |
| 2,002,094 | Meade | May 21, 1935 |
| 2,189,206 | Griffin | Feb. 6, 1940 |
| 2,292,255 | Weisberg | Aug. 4, 1942 |
| 2,464,421 | Torres | Mar. 15, 1949 |
| 2,581,148 | Scull et al. | Jan. 1, 1952 |
| 2,632,706 | Montgomery, Jr. | Mar. 24, 1953 |